Jan. 11, 1966     C. A. SMITH ETAL     3,228,701
SPREADER
Filed April 2, 1964
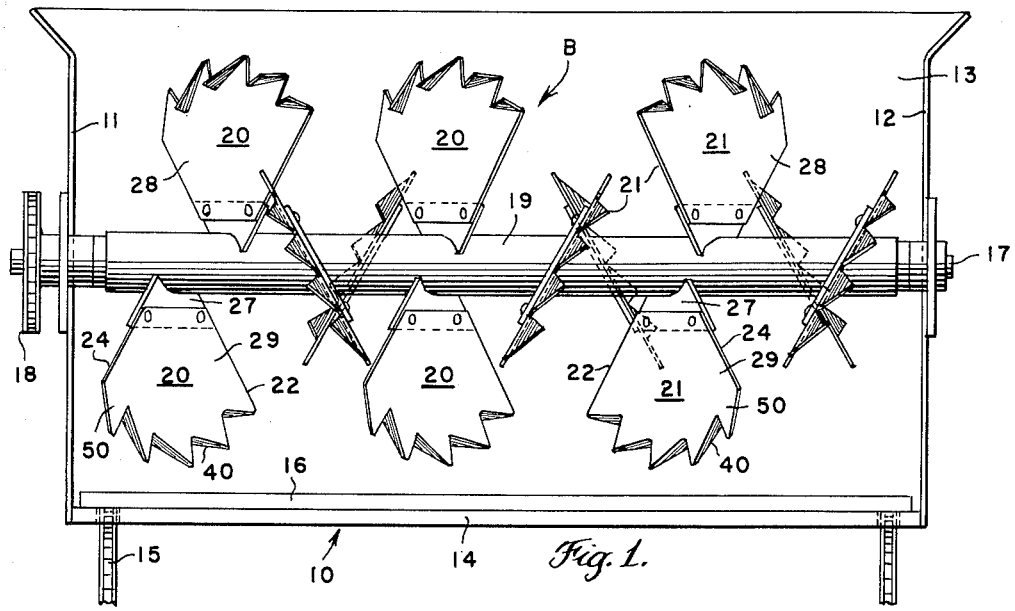
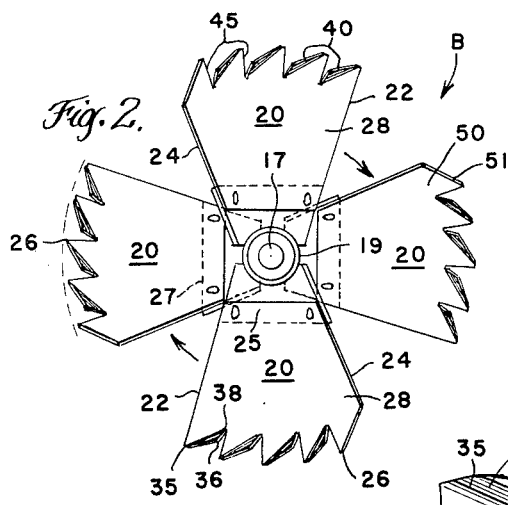
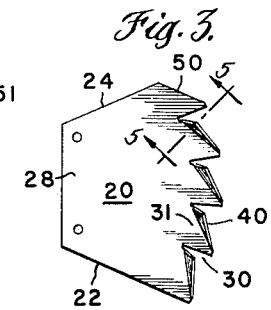
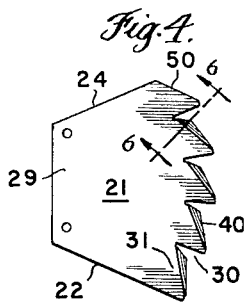
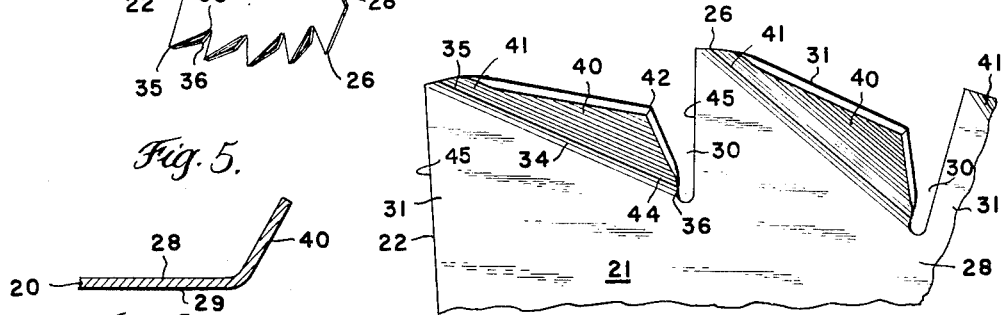
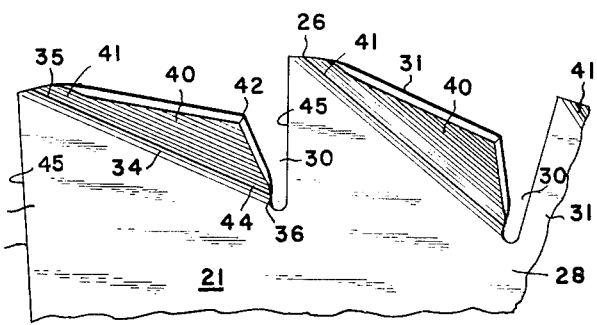
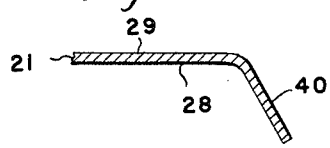
INVENTORS
CHARLES A. SMITH &
HORACE G. MC CARTY
BY Joseph A. Brown
ATTORNEY

United States Patent Office 3,228,701
Patented Jan. 11, 1966

3,228,701
SPREADER
Charles A. Smith and Horace G. McCarty, New Holland, Pa., assignors to Sperry Rand Corporation, New Holland, Pa., a corporation of Delaware
Filed Apr. 2, 1964, Ser. No. 356,922
2 Claims. (Cl. 275—15)

This invention relates generally to a beater structure for a manure spreader or the like, and more particularly to an improved paddle for a spreader beater.

One type of manure spreader has a single beater provided with paddles which serve not only to spread material but to tear it up. When the material is of a pasty consistency, like mortar used by a mason and commonly found in poultry operations, paddle designs heretofore employed have been generally ineffective.

A main object of this invention is to provide an improved beater paddle which will effectively handle pasty manure as well as any other type of common material.

Another object of this invention is to provide a spreader beater paddle which will scoop material from a main supply, tear it up and then distribute the material in an even pattern.

Another object of this invention is to provide a beater paddle of the character described having a series of radial edges which direct successive sharp tearing blows to material followed by positive scooping and spreading of the material.

A further object of this invention is to provide a beater paddle so designed that it achieves the foregoing objects with a structure which can be manufactured at a moderate cost.

Other objects of this invention will be apparent hereinafter from the specification and from the recital in the appended claims.

In the drawing:

FIG. 1 is a view looking at a manure spreader from the rear and showing a beater having paddles constructed to this invention;

FIG. 2 is an end view of the beater looking from the left end of the beater as shown in FIG. 1 and to the right;

FIG. 3 shows one of the paddles used on the left half of the beater when viewed as shown in FIG. 1;

FIG. 4 shows one of the paddles used on the right half of the beater when viewed as shown in FIG. 1;

FIGS. 5 and 6 are sections taken on the lines 5—5 of FIG. 3 and 6—6 of FIG. 4, respectively, and showing the raker elements on the paddles;

FIG. 7 is an enlarged fragmentary side elevational view of one corner of the blade shown in FIG. 4 and looking toward the material engaging side of the blade to illustrate the details of the structure of the blade; and FIG. 8 shows a modified form of raker element.

Referring now to the drawing by numeral of reference, and first to FIG. 1, 10 denotes a spreader box having side walls 11 and 12, a front wall 13 and a floor 14. Endless chains 15 extend along opposite longitudinal side edges of the floor and adjacent the spreader sides to carry transverse slats 16 for moving manure in a mass away from wall 13 and toward the rear of the spreader box.

Extending across the rear of box 10 is a beater B having a shaft 17, the ends of which are rotatably journaled in the spreader box sides 11 and 12. A sprocket 18 is provided on one end of the shaft 17 to be driven from a source of power not shown to rotate the beater in a clockwise direction when viewed as shown in FIG. 2 and as indicated by the arrows. Shaft 17 has a tube 19 affixed to it which carries a left hand set of six paddles 20 and a similar set of six right hand paddles 21 spirally arranged on the tube 19 as shown. The paddles 21 are of identical construction to the paddles 20 except they are formed in reverse. Half of the material discharged from the box 10 is distributed by the paddles 20 and the other half by the paddles 21.

Each paddle on beater B comprises a fan-shaped piece of flat steel having a radially extending leading edge 22, a radially extending trailing edge 24, as inner end 25 and a generally arcuate outer end 26. The inner ends 25 of the paddles are fastened to brackets 27 on tube 19. When mounted on the beater B, each paddle extends diagonally relative to its plane of rotation to provide a wide, flat material engaging side face 28 and a rear face 29.

As shown best in FIG. 7, the arcuate outer end 26 of each paddle has radial cuts 30, angularly spaced from each other and extending from the periphery of the paddle inwardly. These cuts form a series of blade segments 31 on each paddle, the segments being generally rectangular. In the paddle design shown, there are five segments 31. The first four segments toward the leading edge 22 of the blade are bent along a line 34, having one end 35 toward paddle leading edge 22 and along the outer end 26, to an opposite end 36 substantially spaced radially inwardly of end 26 and toward the trailing edge 24 of the paddle. Each bend 34 forms a raker element 40 on its associated segment 31, each raker extending toward the material engaging side 28 of the paddle. Each raker element is of triangular shape, having a generally pointed leading end 41. The free corner 42 of each raker is rearwardly of the end 41 relative to paddle edge 22 and about the same radial distance from the axis of beater shaft 17. The other corner 44 of each raker is substantially spaced radially inwardly of corner 42 and closer to the axis of shaft 16. Also, the corner 42 is substantially laterally spaced from the body of the blade while the corner 44 is in the plane of the blade.

As indicated in FIGS. 5 and 6, the raker elements on the paddles 20 and 21 are exactly the same except that with the paddles 20, the rakers extend in one direction and on the paddles 21 they extend in the opposite direction. When the spreader box is viewed from the front end looking rearwardly, the paddles 20 wide spread material rearwardly and to the right while the paddles 21 spread the material rearwardly and to the left. This enables a spreading and distribution of the material wider than the axial dimension of the beater.

With the paddle construction described, the cuts 30 and bent-in raker elements 40 form unobstructed radial edges 45 on each paddle segment 31. These edges 45 tear into the material in the spreader box 10 when the beater B is rotated. The series of radial edges 45 deliver successive tearing blows to the material to shake it loose and break it up. The rakers 40 following these edges scoop the torn material and spread it in an even pattern.

To prevent material from hanging up on the paddles when it is thrown, the fifth segment in the series of segments 31 on each paddle and denoted 50 is flat and has no raker element. The segment 50 is cut off diagonally at 51. While such last segment has a radial edge for tearing material the same as the other segments, it has no raker element and insures free discharge of material from the paddle.

The blades 20 and 21 are subject to manufacture at moderate cost. When incorporated into a single beater spreader, they will effectively handle pasty chicken manure as well as any other material. A much greater tearing action is provided than heretofore and a more positive distribution of material results.

In FIG. 8, a modified form of raker element 60 is shown. Such a raker element has a concave material engaging face 61 instead of a linear face as shown on the raker elements on FIGS. 5 and 6. Such curved face is desirable when the material to be handled is very liquid.

While this invention has been described in connection with two embodiments thereof, it will be understood that it is capable of modification, and this application is intended to cover any variations, uses, or adaptions following, in general, the principles of the invention and including such departures from the present disclosure as come within known or customary practice in the art to which the invention pertains, and as fall within the scope of the invention or the limits of the appended claims.

Having thus described our invention, what we claim is:

1. A paddle for manure spreaders and the like mountable on a rotatable shaft to extend radially outwardly therefrom and comprising, a blade having a generally flat body an inner end of which is attachable to the shaft and an outer end of which is generally arcuate, said blade having a radial leading end and a radial trailing end and the blade being mountable in a plane oblique to the axis of rotation of said shaft to provide a material distributing surface at one side of blade, said blade outer end having radially inwardly extending angularly spaced cuts forming a series of blade segments between said leading and trailing edges, some of said segments being bent from adjacent an outer corner of the segment along the blade outer end and toward said leading edge to adjacent an inner corner of the segment toward said trailing edge to form raker elements projecting from the plane of the blade beyond said one distributing side surface, each segment providing a leading material engaging radial edge in the plane of the blade, each raker element having a narrow leading end and a relatively wide trailing end both within the arcuate outer end of the blade, the last segment in said series adjacent said trailing edge of the blade being cut off along a line having a forward end adjacent the forward end of the segment and adjacent the blade arcuate outer end to a rearward end spaced radially inwardly from said arcuate end and at the blade trailing edge, and said last segment lying in the same plane as said generally flat body to form a smooth cutting element which allows for the free discharge of material from the paddle.

2. A paddle for manure spreaders and the like, as recited in claim 1, wherein each segment is linear in cross section.

References Cited by the Examiner
UNITED STATES PATENTS

| | | | |
|---|---|---|---|
| 2,240,720 | 5/1941 | Selhorst | 275—6 |
| 3,123,363 | 3/1964 | Hedtke | 275—6 |
| 3,175,830 | 4/1965 | Lepp | 275—6 |

ABRAHAM G. STONE, *Primary Examiner.*

J. R. OAKS, *Assistant Examiner.*